(12) United States Patent
Biwersi et al.

(10) Patent No.: US 9,791,065 B2
(45) Date of Patent: Oct. 17, 2017

(54) HYDRAULIC VALVE DEVICE

(71) Applicant: HYDAC FILTERTECHNIK GMBH, Sulzbach/Saar (DE)

(72) Inventors: Sascha Alexander Biwersi, Mettlach (DE); Christoph Stoenner, St. Ingbert (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 15/027,449

(22) PCT Filed: Nov. 12, 2014

(86) PCT No.: PCT/EP2014/003032
§ 371 (c)(1),
(2) Date: Apr. 6, 2016

(87) PCT Pub. No.: WO2015/090493
PCT Pub. Date: Jun. 25, 2015

(65) Prior Publication Data
US 2016/0281878 A1 Sep. 29, 2016

(30) Foreign Application Priority Data
Dec. 16, 2013 (DE) .......... 10 2013 021 317

(51) Int. Cl.
*F16K 31/143* (2006.01)
*F16K 31/122* (2006.01)
*F16K 11/07* (2006.01)

(52) U.S. Cl.
CPC ........ *F16K 31/143* (2013.01); *F16K 11/07* (2013.01); *F16K 11/0716* (2013.01); *F16K 31/1221* (2013.01)

(58) Field of Classification Search
CPC .......... F16K 11/0704; F16K 31/143; F16K 11/0716; F16K 31/1221; F16K 11/07;
(Continued)

(56) References Cited

U.S. PATENT DOCUMENTS 3,862,645 A * 1/1975 Bianchetta ............ E02F 9/2004
137/625.3
4,369,677 A * 1/1983 Lewis ................... F16H 61/029
137/625.69

(Continued)

FOREIGN PATENT DOCUMENTS

DE 1 550 295 2/1972
DE 31 35 109 4/1983
(Continued)

OTHER PUBLICATIONS

International Search Report (ISR) dated Mar. 5, 2015 in International (PCT) Application No. PCT/EP2014/003032.

*Primary Examiner* — Michael R Reid
(74) *Attorney, Agent, or Firm* — Wenderoth, Lind & Ponack, L.L.P.

(57) ABSTRACT

A hydraulic valve device, in particular an LS directional valve, includes a housing (1), with a pressure supply connection (P), at least one utility connection (A, B), and a load-reporting connection, and includes a controller (5) moveable in two directions to at least partly actuate fluid those connections. An adjustable stop device (25, 31, 47, 59) restricts the stroke length of the travel movements of the controller (5) or parts of the stroke length in either direction. The stop device (25, 31, 47, 59) has a stop surface (25) facing in one movement direction and a second stop surface (47) facing in the other movement direction on the same axial end region (19) of a slider piston (5). A counter stop (31, 59) is provided for each stop surface (25, 47). Both
(Continued)

counter stops are on the respective same housing end region (11) of the housing (1) in a positionally adjustable manner.

26 Claims, 3 Drawing Sheets

(58) Field of Classification Search
CPC ....... Y10T 137/86879; Y10T 137/8671; Y10T 137/86767
USPC .......................... 137/625.48, 625.34, 625.69; 251/284–285
See application file for complete search history.

(56) References Cited

U.S. PATENT DOCUMENTS

| | | | | |
|---|---|---|---|---|
| 4,422,475 | A | * | 12/1983 | Aspinwall ........... F15B 13/0402 137/596.17 |
| 5,078,179 | A | * | 1/1992 | Amrhein ............. F16K 11/0716 137/625.3 |
| 2004/0238051 | A1 | | 12/2004 | Tranovich et al. |
| 2013/0168580 | A1 | | 7/2013 | Burgett et al. |

FOREIGN PATENT DOCUMENTS

| DE | 1112 45 832 | 11/2003 |
|---|---|---|
| WO | 98/05870 | 12/1998 |
| WO | 2010/063515 | 6/2010 |

\* cited by examiner

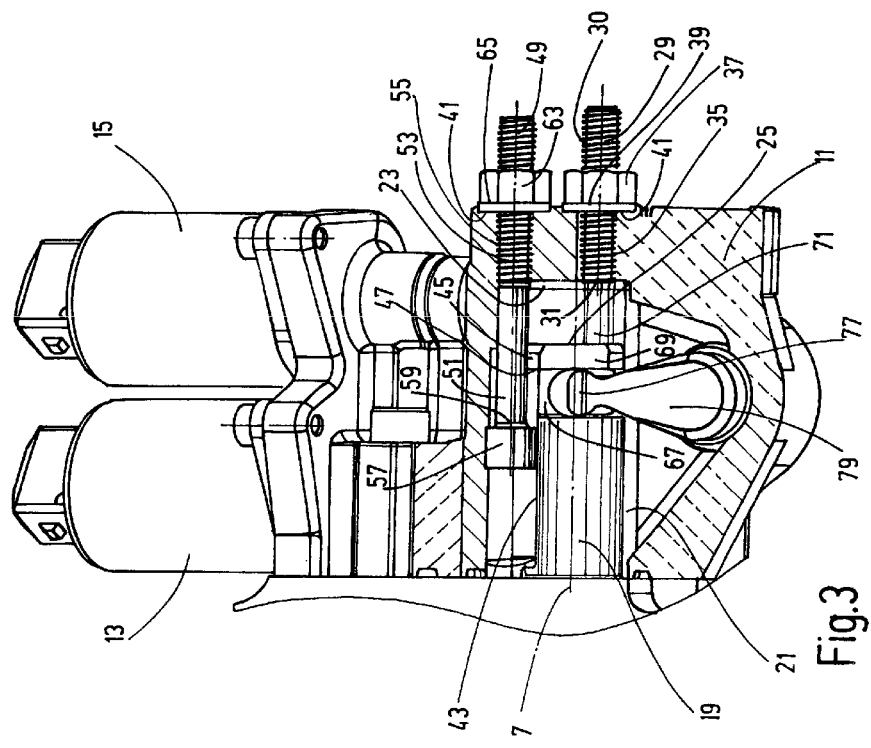
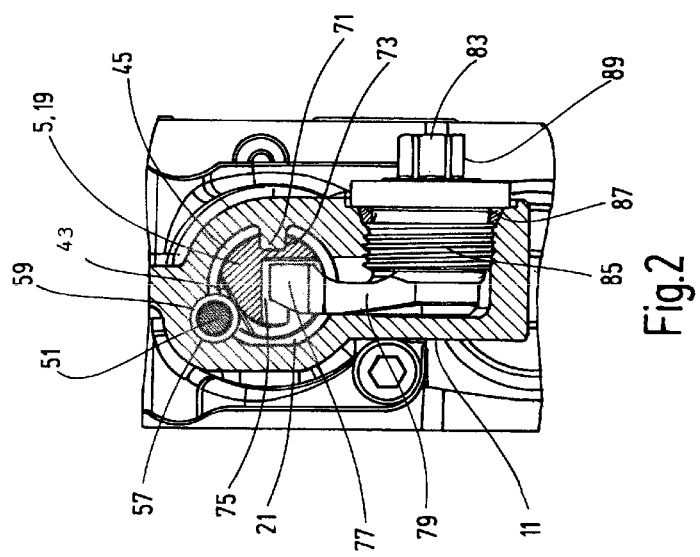

HYDRAULIC VALVE DEVICE

FIELD OF THE INVENTION

The invention relates to a hydraulic valve device, preferably an LS directional valve, comprising fluid ports provided on a housing arrangement, such as at least one pressure supply port P, at least one utility port A, B, and preferably a load-reporting port, and comprising a controller. The controller can be moved in one movement direction or another movement direction to at least partly actuate the fluid ports of the housing arrangement. An adjustable stop device restricts the stroke length of the travel movements of the controller or parts of the stroke length in the one direction or in the other direction.

BACKGROUND OF THE INVENTION

Valve devices of this kind are frequently used to drive hydraulic actuators. In doing so, adjustable stroke stops have the task of limiting the maximum volume flow of a valve section, and thus, the maximum speed of a work function, for instance, the travel movement of the piston of a working cylinder or the working speed of another actuator. For a corresponding stroke limitation, the state of the art provides an adjustable end stop, which interacts with the controller or parts, which are in operative connection with the controller, at both axial end regions, in relation to the axis of the movements of the controller. Document WO 98/05870, for instance, shows such a solution, in which each end stop acts on a measuring piston at one or the other end of a control spool. Such solutions are disadvantageous, inasmuch as both sides of the housing assembly of the valve devices have to be accessible for conducting adjustment measures to the end stops. In many installation positions, a free and unhindered access is only possible on one side. For valve devices actuated by a hand lever, this accessibility on only side is usually the case on the side of the hand lever side. For valve devices actuated by a hand lever, the prior art provides, as a further solution of the adjustment problem, the possibility of making the adjustment for both end stops at the hand lever side. In this solution, an end stop acts directly on the control spool of the controller. The second end stop acts on the hand lever device to limit it to a lever end position. Since the adjustment acts only indirectly, namely through the mechanics of the hand lever device, on the control spool, the stop device operates very inaccurately due to the play, friction and deformation of the adjustment mechanism. Because of the unfavorable translation of the actuation forces, deformations of mechanics and a further deterioration of the adjustment accuracy also arise.

SUMMARY OF THE INVENTION

The invention addresses the problem of providing a valve device of the type mentioned at the beginning, which makes for an easy, safe and accurate adjustment of the stop device.

According to the invention, this problem is basically solved by an improved hydraulic valve device having, as one essential feature of the invention, a stop device with a stop surface facing one movement direction and a second stop surface facing the other movement direction, at the same axial end portion of a spool piston of the controller. Each stop surface has a counter-stop arranged on the same relevant end region of the housing assembly, in a positionally adjustable manner. In this way, not only both counter-stops are accessible from one housing side, but they also act directly on the control spool, i.e. without intermediate mechanical members. The counter stops are therefore only subjected to tension or pressure, resulting neither in perceptible deformations nor in strength issues. The stop device is not only easily and conveniently adjustable, but also ensures a high adjustment accuracy.

Particularly advantageously, one stop surface may be formed directly on the front face of the axial end of the spool piston in question.

In particularly advantageous embodiments, the spool piston on the relevant axial end portion is provided with a recess to form the second stop surface. The second stop surface is formed by a wall surface of the recess. The wall surface is between the base of the recess and the outer periphery of the spool piston. This stop surface is available at the same axial end portion of the spool piston for each direction of the travel movement.

The counter-stop for the stop surface located on the front face of the spool piston may be formed in a particularly advantageous manner at a set-screw extending in the associated end region of the housing assembly and in parallel to the travel axis. The set screw is accessible from the outside of the housing for adjustment purposes.

With respect to the adjustable counter-stop for the second stop surface, the arrangement may be advantageously made such that this counter-stop is formed by a stepped surface between the shank of a second set-screw and its radially enlarged head portion provided for engagement in the recess.

In particularly advantageous embodiments, a second set-screw is arranged in parallel to the travel axis in the associated end region of the housing assembly next to the first set-screw, and is likewise accessible from the outside of the housing. For this positioning of the second set-screw, the recess of the spool piston forming the second stop surface with a wall surface can be formed by a longitudinal groove extending in the spool piston along the travel axis.

For that design of the stop device, the head portion of the second set-screw is located in the longitudinal groove of the spool piston during operating conditions. The set screw shaft extends beyond the closed end of the longitudinal groove. In this configuration, the assembly and disassembly can be carried out by rotating the spool piston. To this end, the arrangement can advantageously be made such that a transverse groove is formed in the spool piston, which transverse groove opens in the longitudinal groove in such a manner that the transverse groove forms, upon rotation of the spool piston, an exit for the head portion of the second set-screw from the longitudinal groove. A break in the wall of the transverse groove forms a further exit for the head portion of the second set-screw leading to the front face of the spool piston. The transverse groove can be positioned such that the head portion can be aligned with the longitudinal groove for insertion into or extraction from it, if the spool piston is rotated in an axial position, which axial position is outside of the operating working stroke range. The break in the wall of the transverse groove is located, offset in the circumferential direction of the spool piston, in a position such that the head portion can leave the transverse groove in the axial direction at this mounting rotational position of the spool piston.

The break in the wall of the transverse groove can be formed in such that a flat beveling extending along a chord at the circumference of the spool piston is provided at the spool piston.

In exemplary embodiments of the valve device in which manual actuation is provided, the arrangement may with particular advantage be such that a recess extends in the spool piston from the bottom of the transverse groove radially inwards, for the engagement of a driver element of a device for manual generation of travel movements.

Furthermore, in particularly advantageous exemplary embodiments, at the housing arrangement, a guiding device for the spool piston may be arranged such that it secures the spool piston against rotation only in axial positions corresponding to the operational working stroke range. Outside this working stroke range, the guiding device releases the spool piston for rotation into the mounting rotational position.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 2 is an end view in section of the valve device taken along line II-II of FIG. 1;

FIG. 3 is a side view in partial section of an axial end region of the housing assembly of the exemplary embodiment.

DETAILED DESCRIPTION OF THE INVENTION

Figure 1:
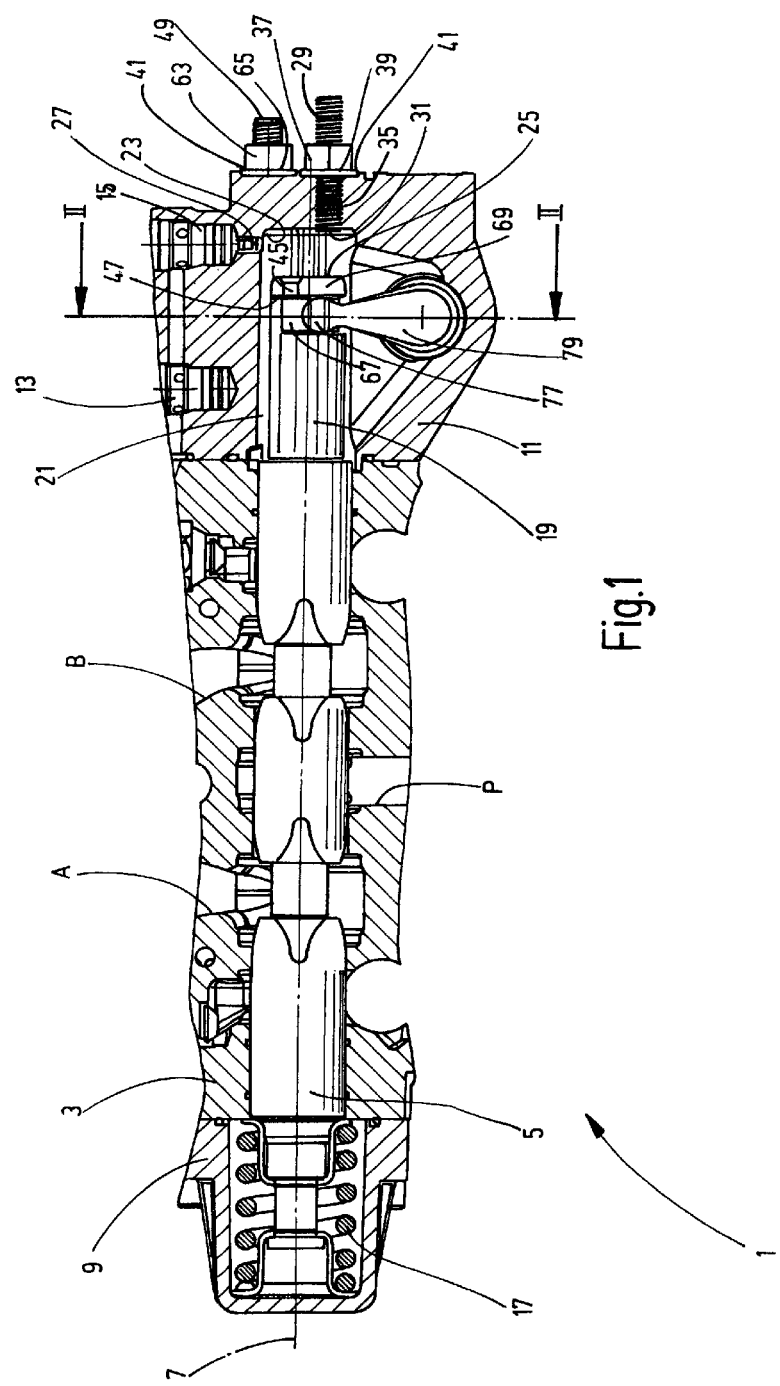
FIG. 1 is a side view in section of a valve device according to an exemplary embodiment of the invention, only partially displaying the housing assembly.

With reference to the drawings, the valve device according to the invention is explained using the example of an LS-directional valve. FIG. 1 shows only the main housing parts of the housing assembly 1 functionally connected to the hydraulic controller, namely a control housing 3. A control piston 5 of the controller can be moved in control housing 3 along a travel or longitudinal axis 7. Housing end regions 9 and 11 close the control housing 3 at both axial ends. The control housing 3 has housing ports typical for such valve devices, such as a pressure supply port P, two utility ports A and B. Other ports, such as tank-return ports or ports for a pressure balance for instance, are not numbered in FIG. 1. The control piston 5 of the controller as such is controlled in a known manner and is therefore not described in more detail, by conventional, electromagnetically operated pilot valves 13 and 15. A spring assembly 17 located in the housing end region 9 specifies a neutral or center position for the control piston 5 in the usual in way for such directional valves. As the valve function in this respect conforms with the prior art, the following description will be directed only at the axial end region 11 shown on the right in FIG. 1, containing the stop device for the stroke limitation of the control piston 5 and its axial end portion 19.

This housing-end region 11 is connected to the control housing 3 of the multi-part housing assembly 1 in a sealed manner and has an internal cylindrical pressure chamber 21, extending along the travel axis 7 and into which pressure chamber 21 the end portion 19 of the spool piston 5 extends. The inner diameter of the pressure chamber 21 is larger than the outer diameter of the end portion 19 of the control piston 5, and has an axial length, such that the closed end 23 is located outside of the operating working stroke range of the control piston 5. Control piston 5 therefore does not touch the end 23 of the pressure chamber 21 in the most extreme approach of its axial end surface 25 to the pressure chamber end 23. A connection 27 from the pilot valve 15 opens into the pressure chamber 21 in the vicinity of the end 23.

Figure 4:
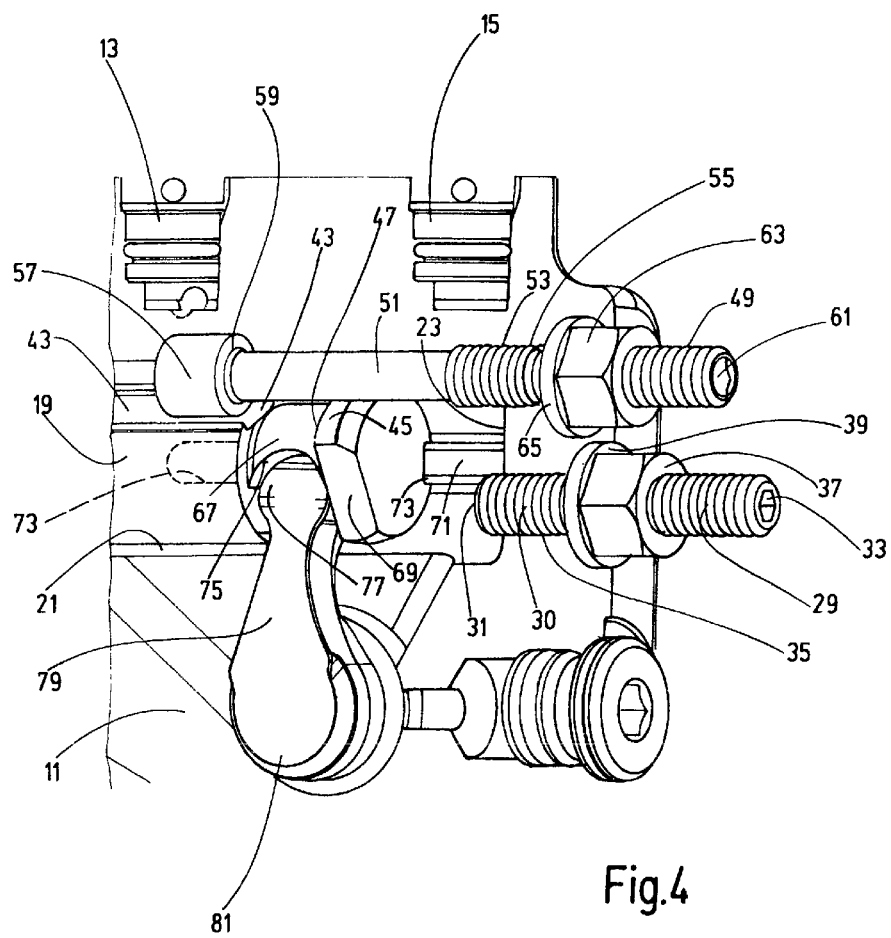
FIG. 4 is a perspective view of a part of the end region of the housing assembly of the exemplary embodiment, having the stop device, drawn to a larger scale.

The details of the adjustable stop device are clearly visible in FIGS. 2 to 4, which show the housing end region 11 in a separate representation. The stop surfaces, limiting, in conjunction with the associated counter-stops of the adjustable stop device, the strokes of the travel movements of the control piston 5 in one or the other direction of movement, are both formed at the end portion 19 of the spool piston 5. The first stop surface, which limits the stroke of the spool piston 5 towards the end 23 of the chamber 21, is formed by the front face 25 of the spool piston 5, which has the shape of a radial plane. As an adjustable counter-stop for the front face 25, a set-screw 29 is provided in the form of a threaded bolt. One end 31 of shank 30 of set screw 29 forms the counter-stop for the front face 25 as stop surface of the control piston 5. The other, outer end of the shaft 30 is provided with a hexagon socket 33. The set-screw 29 passes through a threaded bore 35, which extends in close proximity to the travel axis 7, in the housing end region 11 in parallel to the axis 7. The set-screw 29, which becomes rotatable by inserting a rotating tool at the hexagon socket 33 for positional adjustment, i.e. for limiting the stroke, can be retained in its respective adjusted position using a collar nut 37 having sealing function. Collar nut 37 abuts the outside of the housing end region 11 with its flange-shaped, extended collar 39. The collar 39 is seated in a shallow depression 41.

The second stop surface, opposite the front face 25, which front face 25 acts as the first stop surface, is formed at the end portion 19 of the spool piston 5 in close axial proximity to the front face 25. The end portion 19 has a special shape, as indicated in particular in FIGS. 2 to 4. To this end, a recess has been formed in the end portion 19 in the form of a longitudinal groove 43 incorporated in the circumference of the end portion 19 of the control piston 5. Groove 43 extends axially parallel over almost the entire axial length of the end portion 19 in the direction of the front face 25, but which ends at a distance therefrom, resulting in a non-recessed area 45 between the front face 25 and the longitudinal groove 43. On the inside of non-recessed area 45, a wall surface 47 forms an axial boundary of the longitudinal groove 43. This wall surface 47 serves as the second stop surface of the adjustable stop device.

A second set screw 49 is provided as a positionally adjustable counter-stop for the wall surface 47 of the longitudinal groove 43 acting as the second stop surface. Shaft 51 of set screw 49 has threaded portion 53 extending through a threaded bore 55 in the housing end region 11. Threaded bore 55 extends axially parallel to and at a distance from the travel axis 7 such that the shaft 51 extends over the non-recessed area 45 of the end portion 19. A radially enlarged head 57 of set screw 49 engages in the recessed longitudinal groove 43, however. For this positional arrangement, the head 57 forms, using the stepped surface 59 located between it and the shaft 51, the second counter-stop for the interaction with the wall surface 47 at the end of the longitudinal groove 43 acting as the second stop surface.

As for the first set-screw 29, the second set-screw 49 is also provided with a hexagon socket 61 at the end for an easy adjustment rotation. In the same way as for the first set-screw 29, a collar nut 63 is provided for retaining the set position. A radially extended collar 65 of collar nut 63 sits in a recess 41 of the housing end region 11 in the same manner as the collar 39 of the other nut 37.

Because in the present configuration the second set-screw 49 can extend over the non-recessed area 45 of the end portion 19 using its shaft 51, but not using the radially enlarged head 57, for assembly/disassembly purposes an exit for the screw head 57 is provided. Via the exit, the screw head 57 can leave both the area of the longitudinal groove 43 and can come clear from the end portion 19 of the spool piston 5. For this purpose, a second recess in the form of a transverse groove 67 is provided. Immediately adjacent to the end-side wall surface 47 of the longitudinal groove 43, transverse groove 67 opens into the longitudinal groove 43. The bottom of the transverse groove 67 has the same radial depth in the end portion 19 as the bottom of the longitudinal groove 43. The axial width of the transverse groove 67 is adapted to the axial length of the head 57 so that it can enter the transverse groove 67, if the spool piston 5 is rotated correspondingly far from the rotational position shown in the figures. To enable the head 57, at a corresponding rotation, during which it has left the area of the longitudinal groove 43, to come completely clear from the end portion 19, the transverse groove 67 has a beveling 69 in the circumferential region offset in relation to the wall surface 47 of the longitudinal groove 43. Beveling 69 forms a break in the wall of the transverse groove 67, radially deepening the circumferential region of the end portion 19 in relation to the non-recessed area 45 such that the head 57 comes clear from the end portion 19 upon a corresponding axial displacement of the end portion 19.

Whereas a rotary movement of the control piston 5 is provided for mounting/dismounting purposes, the spool piston 5 should not be rotatably movable in operation. To this end, an axis-parallel guide rib 71, projecting into the pressure chamber 21, is provided at the housing end region 11. Guide rub 71 engages in an associated axial guide groove 73 in the end portion 19. In doing so, the axial length of the rib 71 is selected such that it only engages in the guide groove 73 in the normal operating working stroke range. The spool piston 5 is out of engagement with the guide rib 71 in axial positions for assembly/disassembly purposes, and therefore, is then rotatable.

In the present exemplary embodiment, a device for actuation by hand lever is provided. For this purpose, a further, radially extending recess 75 is incorporated in the end portion 19 in the bottom of the transverse groove 67. This transverse groove 67 can be engaged with a rounded driving head 77 at the end of a pivot lever 79. Pivot lever 79 is pivotable around a pivot axis 81 using a hand lever (not shown in the drawing). The pivotability is designed such that the driving head 77 can enter the recess 75 for a fully counterclockwise pivoted position of the pivoting lever 79 and a corresponding axial position of the end portion 19, but cannot leave the recess 75 in axial positions corresponding to the operational working stroke range. As shown in FIG. 2, the pivot lever 79 is located at the end of a pin 83, which is located in a sealed lead-through 85 screwed into the housing end region 11, which is externally sealed from the end region 11 by a sealing element 87. A hand lever for the manual rotary operation mounted on a hexagon head 89 of the pin 83 has been omitted in FIG. 2.

While the present exemplary embodiment relates to an LS-directional valve, the adjustable stop device according to the invention can be likewise advantageously used for other types of valve devices, in which a stroke limiter of the hydraulic controller is desirable or required.

While one embodiment has been chosen to illustrate the invention, it will be understood by those skilled in the art that various changes and modifications can be made therein without departing from the scope of the invention as defined in the claims.

The invention claimed is:

1. A valve device, comprising:
a housing assembly having a pressure supply fluid port and a utility fluid port;
a control spool piston movable in said housing assembly in first and second movement directions to at least partially actuate said fluid ports; and
an adjustable stop device restricting a stroke length of travel movements of said control spool piston in the first and second directions, said stop device having a first stop surface facing the first movement direction and a second stop surface facing the second movement direction, said first and second stop surfaces being at a same axial end portion on said control spool piston, said stop device also having first and second counter-stops for engaging said first and second stop surfaces, respectively, said first and second counter-stops being on a same end region of said housing assembly and being positionally adjustable in said housing assembly, said first counter-stop including a first set screw with a longitudinal axis extending in said end region of said housing assembly and said longitudinal axis extending parallel to a travel axis of said control spool piston, said first set screw being accessible from outside of said housing assembly.

2. A valve device according to claim 1 wherein
said first stop surface comprises a front face of said axial end portion of said control spool piston.

3. A valve device according to claim 1 wherein
said control spool piston comprises a recess on said axial end portion thereof; and
said second stop surface comprises a wall surface extending between a base of said recess and an outer periphery of said control spool piston.

4. A valve device according to claim 3 wherein
said second counter-stop comprises a stepped surface between a shank and an enlarged head portion of a second set screw, said enlarged head portion being engaged in said recess.

5. A valve device according to claim 4 wherein
said second set screw extends parallel to the travel axis in said end region of said housing assembly adjacent to said first set screw and is accessible from the outside of said housing assembly.

6. A valve device according to claim 5 wherein
said recess in said control spool piston comprises a longitudinal groove extending parallel to the travel axis of said control spool piston.

7. A valve device according to claim 6 wherein
said control spool piston comprises a transverse groove therein opening on and extending radially to said longitudinal groove, such that in one rotational position of said control spool piston about the travel axis said transverse groove forms a first exit for said head portion of said second set screw from said longitudinal groove; and
a break in a wall of said transverse groove forms a second exit for said head portion of said second set screw leading to said first stop surface, said first stop surface being a front face of said end portion of said control spool piston.

8. A valve device according to claim 7 wherein
a flat beveling extends along a chord at the circumference of said control spool piston to form said break in said wall of said transverse groove.

9. A valve device according to claim 7 wherein
said recess in said control spool piston extends from a bottom of said transverse groove radially inwardly and engages a driver element of a device for manually generating travel movements of said control spool piston.

10. A valve device according to claim 1 wherein
said control spool piston is guided in said housing assembly by a guiding device against rotation about a travel axis of said control spool piston only in axial positions of said control spool piston corresponding to an operational stroke range thereof.

11. A valve device, comprising:
a housing having a plurality of fluid ports and opposite first and second end regions;
a control spool movable in said housing along a longitudinal axis of said control spool in opposite first and second directions to at least partially connect respective ones of said fluid ports in fluid communication, said control spool having first and second stop surfaces fixed thereon and facing in said first and second directions, respectively; and
first and second counter stops releasably engaging said first and second stop surfaces, respectively, to limit axial movement of said control spool in the first and second directions, respectively, said first and second counter stops being axially adjustable along first and second adjustment axes parallel to said longitudinal axis, being supported by adjustment members extending through and axially movable in said second end region of said housing and having outer ends accessible on an outer surface of said second end region.

12. A valve device according to claim 11 wherein
said first and second adjustment members comprise parallel first and second set screws, respectively, threaded in said second end region.

13. A valve device according to claim 12 wherein
said first set screw has an end surface abutting a free end surface of said control spool in an end position of said control spool in the first direction.

14. A valve device according to claim 12 wherein
said control spool comprises a longitudinal groove extending parallel to said longitudinal axis on an end portion thereof adjacent said second end region of said housing, said second stop surface being a radially extending wall surface at an end of said longitudinal groove adjacent said second end region of said housing;
said second counter stop comprising a stepped surface between a shank and an enlarged head portion of said second set screw.

15. A valve device according to claim 14 wherein
said control spool piston comprises a transverse groove therein opening on and extending radially to said longitudinal groove, such that in one rotational position of said control spool about the longitudinal axis said transverse groove forms a first exit for said head portion of said second set screw from said longitudinal groove; and a break in a wall of said transverse groove forms a second exit for said head portion of said second set screw leading to said first stop surface.

16. A valve device according to claim 15 wherein
a flat beveling extends along a chord at the circumference of said control spool piston to form said break in said wall of said transverse groove.

17. A valve device according to claim 15 wherein
a recess in said control spool piston extends from a bottom of said transverse groove radially inwardly and engages a driver element of a device for manually generating travel movements of said control spool piston.

18. A valve device according to claim 11 wherein
said control spool is guided in said housing assembly by a guiding device against rotation about a travel axis of said control spool piston only in axial positions of said control spool piston corresponding to an operational stroke range thereof.

19. A valve device, comprising:
a housing assembly having a pressure supply fluid port and a utility fluid port;
a control spool piston movable in said housing assembly in first and second movement directions to at least partially actuate said fluid ports;
an adjustable stop device restricting a stroke length of travel movements of said control spool piston in the first and second directions, said stop device having a first stop surface facing the first movement direction and a second stop surface facing the second movement direction, said first and second stop surfaces being at a same axial end portion on said control spool piston, said stop device also having first and second counter-stops for engaging said first and second stop surfaces, respectively, said first and second counter-stops being on a same end region of said housing assembly and being positionally adjustable in said housing assembly; and
a recess on said axial end portion of said control spool piston, said second stop surface including a wall surface extending between a base of said recess and an outer periphery of said control spool piston, said second counter-stop having a stepped surface between a shank and an enlarged head portion of a first set screw, said enlarged head portion being engaged in said recess.

20. A valve device according to claim 19 wherein
said first stop surface comprises a front face of said axial end portion of said control spool piston.

21. A valve device according to claim 19 wherein
said first counter-stop comprises a second set screw extending in said end region of said housing assembly and extending parallel to a travel axis of said control spool piston, said second set screw being accessible from outside of said housing assembly; and
said first set screw extends parallel to the travel axis in said end region of said housing assembly adjacent to said second set screw and is accessible from the outside of said housing assembly.

22. A valve device according to claim 21 wherein
said recess in said control spool piston comprises a longitudinal groove extending parallel to the travel axis of said control spool piston.

23. A valve device according to claim 22 wherein
said control spool piston comprises a transverse groove therein opening on and extending radially to said longitudinal groove, such that in one rotational position of said control spool piston about the travel axis said transverse groove forms a first exit for said head portion of said first set screw from said longitudinal groove; and a break in a wall of said transverse groove forms a second exit for said head portion of said first set screw leading to said first stop surface, said first stop surface being a front face of said end portion of said control spool piston.

24. A valve device according to claim 23 wherein a flat beveling extends along a chord at the circumference of said control spool piston to form said break in said wall of said transverse groove.

25. A valve device according to claim 23 wherein said recess in said control spool piston extends from a bottom of said transverse groove radially inwardly and engages a driver element of a device for manually generating travel movements of said control spool piston.

26. A valve device according to claim 19 wherein said control spool piston is guided in said housing assembly by a guiding device against rotation about a travel axis of said control spool piston only in axial positions of said control spool piston corresponding to an operational stroke range thereof.

* * * * *